Aug. 12, 1952 A. T. GALE 2,606,756
SHOCK ABSORBER MOUNTING
Filed Sept. 2, 1948 2 SHEETS—SHEET 2
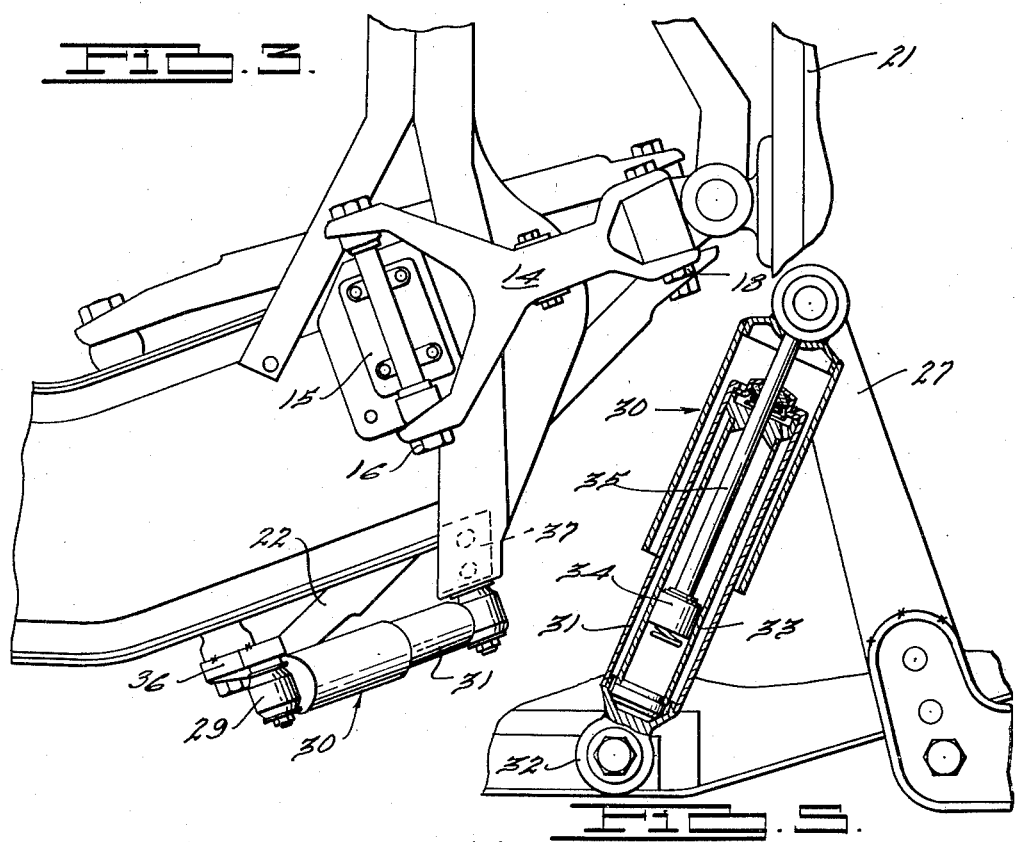
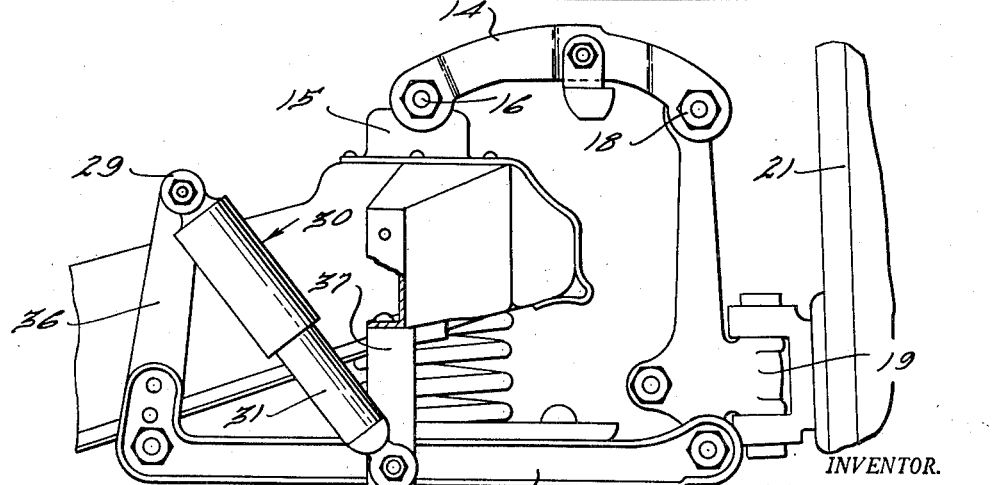
INVENTOR.
Andrew T Gale.
BY
Harness and Harris
ATTORNEYS.

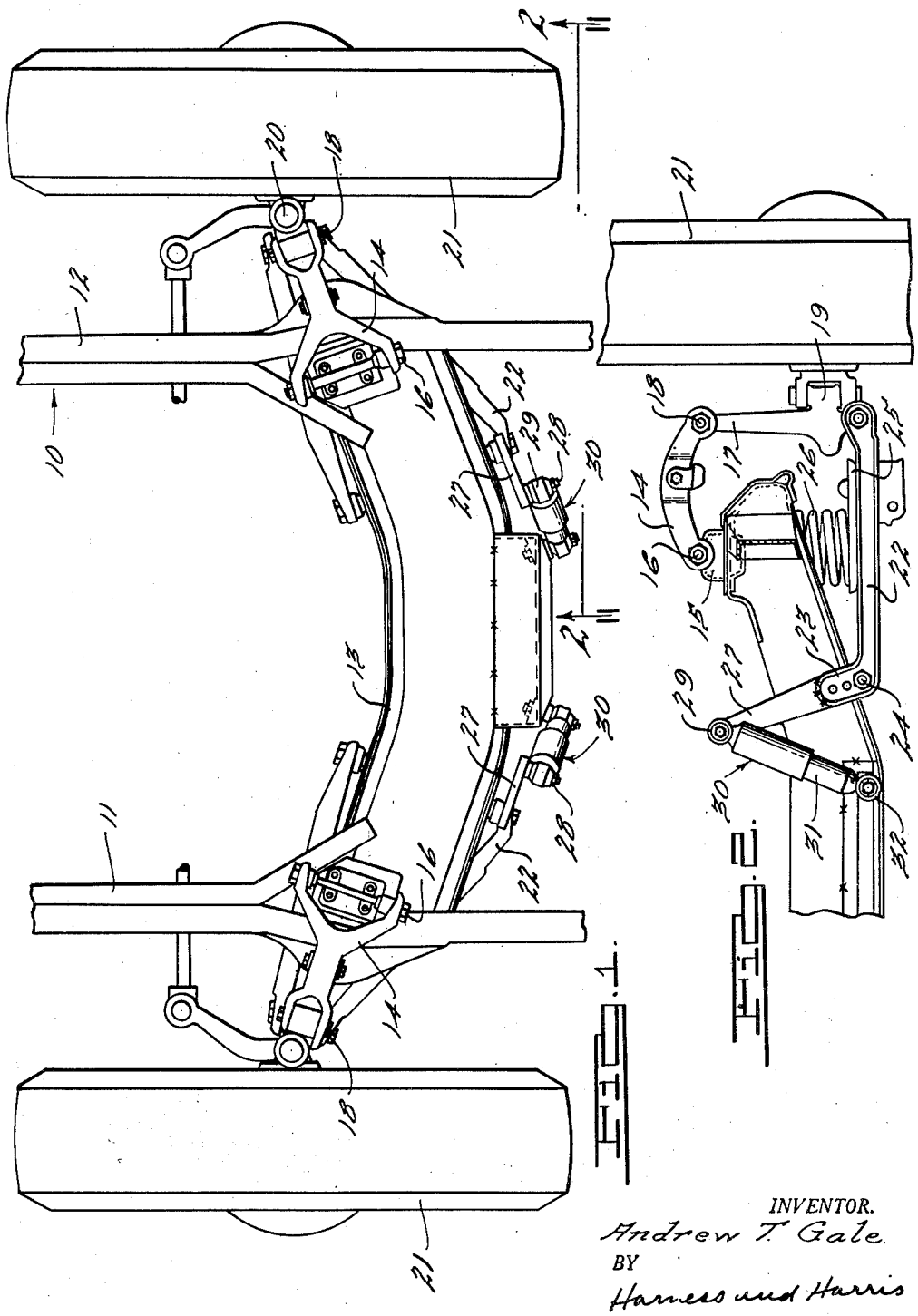

Patented Aug. 12, 1952

2,606,756

UNITED STATES PATENT OFFICE 2,606,756

SHOCK ABSORBER MOUNTING

Andrew T. Gale, Highland Park, Mich., assignor to Chrysler Corporation, Highland Park, Mich., a corporation of Delaware Application September 2, 1948, Serial No. 47,453

5 Claims. (Cl. 267—20)

My invention relates to motor vehicle suspensions and more particularly to the shock absorber mountings thereon.

A principal object of my invention is to provide a vehicle suspension assembly with structure for mounting a conventional telescoping type shock absorber wherein fading of the shock absorber is eliminated.

Another object of my invention is to provide a vehicle with structure of the type which allows the reservoir end of the shock absorber to be mounted on the sprung portion of the vehicle.

A further object of my invention is to provide a vehicle with such structure which is not only sturdy in construction but economical to manufacture.

These objects and advantages of my invention will become more apparent from the following description taken in connection with the accompanying drawings in which:

Fig. 1 is a fragmentary plan view of a vehicle frame structure embodying one form of my invention.

Fig. 2 is a front view taken on the line 2—2 of Fig. 1.

Fig. 3 is a fragmentary plan view of a vehicle frame structure embodying another form of my invention.

Fig. 4 is a fragmentary front view of the structure shown in Fig. 3.

Fig. 5 is an enlarged sectional view of the shock absorber and mounting thereof shown in Fig. 2.

In Figs. 1 and 2 of the drawings, I have shown one form of my invention wherein the numeral 10 indicates frame structure of conventional construction including a pair of aligned substantially paralleled side rails 11 and 12. The side rails 11 and 12 are supported relative to each other at a location intermediate their ends by a cross member 13 which has its respective end portions welded to the side rails 11 and 12. At each end thereof is an independent suspension assembly mounted thereon. Since each suspension is identical in parts, with the exception that one suspension is on one side of the vehicle and the other on the other side of the vehicle, a description for one will suffice for both. The suspension assembly comprises an upper control arm 14 having its inner end pivotally mounted on a projection 15 of the cross member 13 by a pin 16. The outer end of the upper control arm 14 is pivotally connected to the upper extremity of an upright knuckle bracket 17 by a pin 18. The bracket 17 has integrally connected thereto a collar 19 which receives a pin 20 for pivotally carrying a road wheel 21 while the lower extremity of the knuckle bracket 17 is pivotally connected to the outer extremity of a lower control arm 22. The inner extremity 23 of the control arm 22 is pivotally mounted on the underside of the cross member 13 by a pin 24. The lower control arm 22 is provided with a base plate 25 which carries the lower portion of a helical spring 26, while the upper portion of the spring 26 extends upwardly of the cross member 13, and is retained therein.

A pivotal or actuating arm 27 has its lower extremity secured to the lower control arm 22 at the extremity 23 so that the arm 27 will rotate as an incident to the conventional oscillatory movement of the lower control arm in response to rising and falling movement of the wheel 21. The arm 27 may be welded to the lower control arm at the extremity 23 or, if desired, it may be made as an integral portion thereof.

The upper extremity of the arm 27 is provided with a stud and bolt assembly 28 for receiving a ring 29 of a shock absorber, generally designated by the number 30. The shock absorber 30, as seen in detail in Fig. 5, is a conventional hydraulic type employing hydraulic medium therein and is actuated in a telescopic fashion.

The shock absorber 30 comprises generally a reservoir portion 31 which is integrally connected to a ring 32, the latter being pivotally mounted on the cross member 13 at a location on the opposite side of the lower control arm 22 from wheel 21. The reservoir portion 31 is provided with a cylinder 33 which receives a piston 34, the latter being connected to the ring 29 by a piston rod 35.

In this form of the invention the shock absorber 30 is compressed when the wheel 21 is moved upwardly relative to the frame structure 10. When the wheel 21 is moved downwardly relative to the frame structure, the shock absorber 30 is expanded. This up and down motion of the wheel 21 causes the arm 27 to move counterclockwise and clockwise, respectively, and actuates piston rod 35 and the piston 34 within the absorber. Since the reservoir portion 31 of the absorber is mounted on the cross member 13 which forms a part of the sprung portion of the vehicle, relative motion between the wheel 21 and the frame structure 10 is accompanied only by movement of the piston 34 and the piston rod 35. Therefore, the hydraulic medium within the shock absorber is not excessively turned, mixed or aerated.

In Figs. 3 and 4, I have shown another form of my invention wherein like numerals have been applied to like parts. In this form of the invention, the lower control arm 22 is secured to the lower portion of the arm 36 at the former's pivotal connection to the cross member 13. The upper portion of the arm 36 is pivotally connected to the ring 29 of the shock absorber 30. The side rail 12 is provided with a projection 37, the extremity of which is securely connected either by welding or some other suitable means to the underside of the side rail 12, as more clearly seen in Fig. 4. The lower extremity of the projection 37 is pivotally connected to the ring 32 of the shock absorber 30. Therefore, the reservoir portion 31 of the shock absorber 30 is, in effect, connected to the side rail 12 by means of the projection 37, thereby mounting the reservoir portion on the sprung portion of the vehicle.

When the wheel 21 moves upwardly, as viewed in Fig. 4, the arm 36 rotates counter-clockwise expanding the shock absorber 30. When the wheel 21 moves downwardly, the arm 36 rotates clockwise contacting the shock absorber 30. This movement of the shock absorber 30 in connection with the structure, as shown in Figs. 3 and 4, is opposite to the movement of the shock absorber, as shown in Figs. 2 and 5, because the reservoir portion of the shock absorber 30 is mounted on the opposite side of the pivot point of the lower control arm 22 on the cross member 13. As more clearly seen in Fig. 4, the projection 37 extends downwardly so that the ring 32 is pivotally mounted thereon at a location intermediate the aforementioned connection of the lower control arm 22 on the cross member 13 and the wheel 21.

In both forms of the invention, as shown in the drawings, the position of the wheel 21 is at vehicle rest. The arm 27 when rotated counterclockwise by the motion of the wheel 21 upwardly moves the shock absorber 30 into a more vertical position. However, when the arm 27 moves clockwise in response to lowering of the wheel 21, the shock absorber 30 is moved into a more horizontal position. Therefore, the angle at which the arm 27 joins the lower control arm 22 when the vehicle is at rest is not critical, although it has been found that a substantially vertical position of the shocks is more advantageous in order to keep the hydraulic medium of the absorber in the bottom of the reservoir portion 31. The arm 36 is similarly connected to the lower control arm 22 in that the shock absorber 30 is maintained in a substantially vertical position when the vehicle is at rest.

Although but two embodiments of the invention are herein shown and described it will be understood that various changes in the details of construction and materials employed may be made without departing from the spirit of the invention.

I claim:

1. A motor vehicle comprising a frame structure, a road wheel, and means supporting and guiding said wheel from said frame structure for rising and falling movement thereof, said means including upper and lower control arms pivotally connected to said frame structure for oscillating movement relative thereto, an upright member pivotally connecting said control arms and carrying said wheel, a pivotal arm rigidly secured to said lower control arm and extending upwardly therefrom, and a generally-elongated shock absorbing device having one end mounted higher than its other end, the higher end being pivotally connected to said pivotal arm and its lower end being pivotally connected to said frame structure, said pivotal arm being operable to actuate said device in response to said rising and falling movement of said wheel.

2. The subject matter of claim 1 wherein said shock absorbing device is of the hydraulic type including a reservoir portion, said reservoir portion being mounted on said frame structure transversely inwardly of said vehicle from the pivotal connection of said lower control arm to said frame structure.

3. The subject matter of claim 1 wherein said shock absorbing device is of the hydraulic type including a reservoir portion, said reservoir portion being mounted on said frame structure transversely outwardly of said vehicle from the pivotal connection of said lower control arm to said frame structure.

4. In a motor vehicle including a frame and a road wheel, means supporting and guiding said wheel from said frame for rising and following movement thereof comprising upper and lower control arms pivotally connected to said frame for oscillatory movement relative thereto to accommodate said movement of the wheel, a member supporting said wheel in operative relationship with said upper and lower control arms, a pivotal arm rigidly secured to said lower control arm at the latter's pivotal connection to said frame and extending upwardly therefrom, and a hydraulic shock absorber having relatively movable parts including piston means and a fluid reservoir portion, said piston means being pivotally connected to said pivotal arm and said reservoir portion being pivotally mounted on said frame at a location intermediate said pivotal connection of said lower control arm and said wheel, said pivotal arm being operable to expand and contract said absorber in response to said rising and falling movement of said wheel, respectively.

5. In a vehicle including a frame having a side rail and cross member secured to said side rail, said side rail having a projection extending therefrom, and a road wheel, means supporting and guiding said wheel from said frame for rising and falling movement thereof comprising upper and lower control arms pivotally connected to said cross member for oscillatory movement relative thereto to accommodate said movement of the wheel, structure supporting said wheel in operative relationship with said upper and lower control arms, a pivotal arm rigidly secured to said lower control arm at the latter's pivotal connection to said cross member and extending upwardly therefrom, and a hydraulic shock absorber having relatively movable parts including piston means and a fluid reservoir portion, said piston means being pivotally connected to said pivotal arm and said fluid reservoir portion being pivotally connected to said projection at a location intermediate said pivotal connection of said lower control arm to said cross member and said wheel, said pivotal arm being adapted to expand and contract said absorber in response to said rising and falling movement of said wheel, respectively.

ANDREW T. GALE.

REFERENCES CITED

The following references are of record in the file of this patent:

UNITED STATES PATENTS

| Number | Name | Date |
|---|---|---|
| 1,737,328 | Parisi | Nov. 26, 1929 |
| 2,260,634 | Mullner | Oct. 28, 1941 |
| 2,299,935 | Slack et al. | Oct. 27, 1942 |
| 2,314,076 | Casner | Mar. 16, 1943 |

FOREIGN PATENTS

| Number | Country | Date |
|---|---|---|
| 782,921 | France | Mar. 25, 1935 |